United States Patent
Choi et al.

(10) Patent No.: US 8,829,086 B2
(45) Date of Patent: Sep. 9, 2014

(54) GLASS FIBER-REINFORCED POLYCARBONATE FLAME-RETARDANT RESIN COMPOSITION

(71) Applicant: LG Chem, Ltd., Seoul (KR)

(72) Inventors: Jong Kuk Choi, Daejeon (KR); Yong Kim, Daejeon (KR); Myeung Il Kim, Daejeon (KR); Dae Young Ok, Daejeon (KR); Sung Tae Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/072,945

(22) Filed: Nov. 6, 2013

(65) Prior Publication Data

US 2014/0114001 A1 Apr. 24, 2014

Related U.S. Application Data

(63) Continuation of application No. PCT/KR2013/005168, filed on Jun. 12, 2013.

(30) Foreign Application Priority Data

Oct. 18, 2012 (KR) .................. 10-2012-0115778

(51) Int. Cl.
*C08K 5/523* (2006.01)
*C08L 69/00* (2006.01)

(52) U.S. Cl.
CPC ...................... *C08L 69/00* (2013.01)
USPC ............ 524/127; 524/140; 524/141; 524/494

(58) Field of Classification Search
USPC ................... 524/127, 140, 141, 494
See application file for complete search history.

(56) References Cited

U.S. PATENT DOCUMENTS

2010/0298475 A1* 11/2010 Wilson et al. ............... 524/119

FOREIGN PATENT DOCUMENTS

| JP | 08-034896 A | 2/1996 |
|---|---|---|
| JP | 4384330 B2 | 12/2009 |
| KR | 10-0327501 B1 | 10/2002 |
| KR | 10-0816474 B1 | 3/2008 |

\* cited by examiner

*Primary Examiner* — Peter Szekely
(74) *Attorney, Agent, or Firm* — McKenna Long & Aldridge, LLP

(57) ABSTRACT

Disclosed is a glass fiber-reinforced polycarbonate flame-retardant resin composition which comprises (A) 50 to 75% by weight of polycarbonate having a melt index of 22 g/10 min or more (300° C., 1.2 kg), (B) 3 to 15% by weight of a rubber-modified styrene-based graft copolymer, (C) 3 to 10% by weight of a bulk copolymer of an aromatic vinyl compound and a vinyl cyan compound, (D) 1 to 10% by weight of an ethylene acrylate-based copolymer, (E) 10 to 25% by weight of glass fiber, and (F) 5 to 20% by weight of an aromatic phosphate ester-based compound, and thus advantageously exhibits superior flowability, flame retardancy, hardness, impact resistance and appearance qualities.

9 Claims, No Drawings

GLASS FIBER-REINFORCED POLYCARBONATE FLAME-RETARDANT RESIN COMPOSITION

This application is a Continuation Application of International Patent Application No. PCT/KR2013/005168, filed Jun. 12, 2013, and claims the benefit of Korean Application No. 10-2012-0115778, filed on Oct. 18, 2012, all of which are hereby incorporated herein by reference in their entirety for all purposes as if fully set forth herein.

TECHNICAL FIELD

The present invention relates to a glass fiber-reinforced polycarbonate flame-retardant resin composition. More specifically, the present invention relates to a glass fiber-reinforced polycarbonate flame-retardant resin composition with superior flowability, flame retardancy, hardness, impact resistance and appearance qualities, which comprises a rubber-modified styrene-based graft copolymer, a copolymer of an aromatic vinyl compound and a vinyl cyan compound, an ethylene acrylate-based copolymer, glass fiber and an aromatic phosphate ester-based compound in a polycarbonate resin with superior impact resistance, heat resistance and electrical properties, and is thus considerably suitable for use in housings for large electrical and electronic products including housings for TVs.

BACKGROUND ART

Polycarbonate is a type of thermoplastic resin, which is a polymer of Bisphenol A, and is widely used as an engineering plastic material which exhibits superior impact resistance, electrical properties and moldability, maintains physical properties within a wide temperature range and has self-extinguishability. Such a polycarbonate resin has been generally used as a housing for small electrical and electronic products such as cellular phones or notebooks.

However, in recent years, a polycarbonate resin is hard to use in housings of electrical and electronic products which are reduced in size and become complicated, since it has a disadvantage of low processability. In order to solve this problem, a polycarbonate resin is blended with other kinds of resin. For example, when a polycarbonate resin is blended with a common rubber-modified styrene-based graft copolymer, the blended resin has improved processability and maintains high impact strength.

Polycarbonate blend resin has generally been used for computer housings, office machines and the like. However, recently, the polycarbonate blend resin is molded into large products emitting great amounts of heat, such as TVs. For this reason, the polycarbonate blend resin should maintain high mechanical strength and have flame retardancy.

In order to secure flame retardancy, a halogen-based compound and an antimony compound have conventionally been used as flame retardants. However, the halogen-based compound disadvantageously causes generation of gases harmful to human during combustion of final molded articles. Accordingly, a predominant method for securing flame retardancy without using a halogen-based compound is to use a monomer- or oligomer-type phosphate ester compound as a flame retardant.

In addition, in order to improve hardness, glass fiber is added as a reinforcing agent. Glass fiber deteriorates flowability and impact resistance, which is an advantage of polycarbonate, and has a difficulty of securing clear appearance due to glass fiber protruding from the surface of the resin.

Many methods for improving appearance qualities of polycarbonate blend resin in order to solve these problems have been devised, but most of these methods are not sufficiently effective.

In this regard, inventions associated with a resin composition, which prevents deterioration in flowability and impact resistance in spite of adding glass fiber so as to improve hardness, exhibits clear appearance during molding, maximizes advantages of a polycarbonate-based blend resin and minimizes disadvantages thereof, remain unsolved.

DISCLOSURE

Technical Problem

Therefore, the present invention has been made in view of the above problems and it is an object of the present invention to provide a polycarbonate resin composition which has improved impact resistance and processability by using a polycarbonate resin in combination with a rubber-modified styrene-based graft copolymer, realizes high hardness by reinforcing glass fiber, enhances flame retardancy and flowability by using an aromatic phosphate ester compound, and controls protrusion of the glass fiber and thus exhibits superior processability and appearance qualities by using a copolymer of an aromatic vinyl compound and a vinyl cyan compound, and an ethylene acrylate-based copolymer, and is thus suitable as a housing material for TVs.

Technical Solution

In accordance with one aspect of the present invention, the above and other objects can be accomplished by the provision of a glass fiber-reinforced polycarbonate flame-retardant resin composition comprising:

(A) 50 to 75% by weight of polycarbonate having a melt index (300° C., 1.2 kg) of 22 g/10 min or more;
(B) 3 to 15% by weight of a rubber-modified styrene-based graft copolymer;
(C) 3 to 10% by weight of a bulk copolymer of an aromatic vinyl compound and a vinyl cyan compound;
(D) 1 to 10% by weight of an ethylene acrylate-based copolymer;
(E) 10 to 25% by weight of a glass fiber; and
(F) 5 to 20% by weight of an aromatic phosphate ester-based compound.

Hereinafter, the present invention will be described in more detail.

(A) Polycarbonate

Polycarbonate is a polymer of Bisphenol A and has a melt index of 22 g/10 min or higher, or 22 g/10 min to 80 g/10 min. When the melt index is lower than 22 g/10 min, problems associated with processability may occur.

The polycarbonate resin may be used in an amount of 50 to 75% by weight, 39 to 69% by weight or 53 to 62% by weight, based on the total weight of the resin composition. When the amount of the polycarbonate resin is lower than 50% by weight, bonding strength to a resin deteriorates, impact resistance and good appearance may not be obtained, and when the amount thereof exceeds 75% by weight, desired strength may not be obtained.

(B) Rubber-Modified Styrene-Based Graft Copolymer

The rubber-modified styrene-based graft copolymer is obtained by grafting an aromatic vinyl compound and a vinyl cyan compound in a conjugated diene-based rubber polymer, and the conjugated diene-based rubber polymer is prepared by first preparing a small diameter rubber polymer having a relatively small mean particle diameter and preparing a large diameter rubber polymer having a relatively large mean particle diameter through acid fusion.

An amount of the rubber-modified styrene-based copolymer used may be 3 to 15% by weight, 4 to 12% by weight, or 5 to 9% by weight, based on the total weight of the resin composition. When the amount of the rubber-modified styrene-based copolymer is less than 3% by weight, the effect of improvement in impact resistance may be low, and when the amount thereof exceeds 15% by weight, flame retardancy, hardness and appearance qualities may be deteriorated.

(C) Bulk Copolymer of Aromatic Vinyl Compound and Vinyl Cyan Compound

The bulk copolymer of the aromatic vinyl compound and the vinyl cyan compound may be prepared under bulk polymerization conditions commonly used in the art. Specifically, the bulk copolymer is prepared by continuously bulk-polymerizing 20 to 90% by weight or 40 to 80% by weight of an aromatic vinyl compound, and 10 to 80% by weight or 20 to 60% by weight of a vinyl cyan compound.

The aromatic vinyl compound may comprise at least one selected from styrene, α-methyl styrene, para-methyl styrene, o-ethyl styrene, para-ethyl styrene and vinyl toluene and is specifically styrene.

The vinyl cyan compound comprises at least one selected from the group consisting of acrylonitrile, methacrylonitrile and ethacrylonitrile and is specifically acrylonitrile.

The copolymer of the aromatic vinyl compound and the vinyl cyan compound is present in an amount of 3 to 10% by weight, or 4 to 8% by weight, based on the total weight of the resin composition. When the amount of copolymer is lower than 3% by weight, the effect of improvement in flowability may be low, glass fiber hiding force may be also deteriorated, and appearance qualities may be lowered, and when the amount thereof exceeds 10% by weight, flame retardancy and impact resistance may be deteriorated.

(D) Ethylene Acrylate-Based Copolymer

The ethylene acrylate-based copolymer reinforces toughness of plastics and improves flowability, and is for example, an ethylene acrylate copolymer or an ethylene methacrylate copolymer. The copolymer may comprise 15 to 50% by weight, or 20 to 40% by weight of a (meth)acrylate-based monomer. When the amount of the (meth)acrylate-based monomer is lower than 15% by weight, problems associated with compatibility with polycarbonate may occur due to high ethylene content and when the amount exceeds 50% by weight, the effect of reinforcement in impact strength may be deteriorated due to excessively low ethylene content.

The ethylene acrylate-based copolymer may be present in an amount of 1 to 10% by weight, 1 to 7% by weight, or 2 to 4% by weight, based on the total weight of the resin composition. When the amount of the ethylene acrylate-based copolymer is lower than 1% by weight, impact strength and the effect of improvement in glass fiber hiding force are deteriorated and appearance qualities may be thus lowered, and when the amount thereof exceeds 10% by weight, flame retardancy and hardness may be deteriorated.

(E) Glass Fiber

Glass fiber may be added to reinforce hardness of the polycarbonate resin composition, maintains considerably strong bonding force between polymers and thereby improves hardness, and minimizes contraction during plastic molding. For example, the glass fiber may have a length of 2 to 5 μm, 2 to 4 μm, or about 3 μm, and a diameter of 1 to 100 μm, 1 to 50 μm, 10 to 30 μm or 10 to 13 μm.

In another example, the glass fiber may be h(chop) glass fiber having a length of 2 to 5 mm, a width of 15 to 40 μm, and a thickness 5 to 15 μm, or h(chop) glass fiber having a length of 3 to 4 mm, a width of 15 to 30 μm, and a thickness of 10 to 13 μm.

In another example, the glass fiber may be a circular, cocoon or flat type. In another example, the glass fiber may be glass fiber coated with at least one selected from polyolefin and polyorganosiloxane.

The glass fiber may be used in an amount of 10 to 25% by weight, or 15 to 20% by weight, based on the total weight of the resin composition. When the amount of glass fiber is lower than 10% by weight, the desired hardness may be not obtained, and when the amount thereof exceeds 25% by weight, flowability is deteriorated, processing temperature increases and good appearance may not be obtained.

(F) Aromatic Phosphate Ester-Based Compound

The aromatic phosphate ester-based compound serves to impart flame retardancy and is in liquid or powder phase. For example, the aromatic phosphate ester-based compound may be an aromatic monophosphate-based compound, an aromatic diphosphate-based compound, or an aromatic triphosphate-based compound.

In a specific example, the aromatic phosphate ester-based compound may comprise at least one selected from triphenyl phosphate, tricresyl phosphate, trixylenyl phosphate, cresyl diphenyl phosphate, octyl diphenyl phosphate, bisphenol A diphosphate and aromatic diphosphate having a structure represented by the following Formula 1:

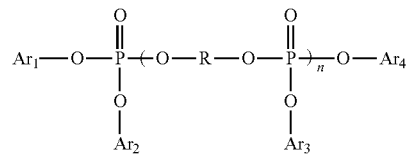

Formula 1

In Formula 1, for example, $Ar_1$, $Ar_2$, $Ar_3$ and $Ar_4$ are identical or different, and are each independently selected from a phenyl group and an aryl group substituted by one to three alkyl groups having 1 to 4 carbon atoms, R is phenyl or bisphenol-A and n is an integer of 1 to 5.

The aromatic phosphate ester-based compound may be used in an amount of 5 to 20% by weight, 8 to 17% by weight, or 10 to 14% by weight, based on the total weight of the resin composition. When the amount of the aromatic phosphate ester-based compound is lower than 5% by weight, desired flame retardancy may not be obtained, and when the amount thereof exceeds 20% by weight, heat resistance and impact resistance may be deteriorated and beautiful appearance may not be obtained.

In addition, the composition of the present invention may further comprise a toning agent, a lubricant, a UV stabilizer, an antioxitant, a coupling enhancer or the like and is thus utilized in various applications.

A thermoplastic resin obtained by molding the glass fiber-reinforced thermoplastic resin composition may be applied to housings of large electrical and electronic products.

Advantageous Effects

Advantageously, the present invention provides a molded article comprising a glass fiber-reinforced polycarbonate flame-retardant resin composition which exhibits improved flowability and reinforced impact resistance, hardness and appearance qualities, and is thus applicable to housings for large electrical and electronic products such as TVs.

BEST MODE

Example

Now, the present invention will be described in more detail with reference to the following examples. These examples are provided only to illustrate the present invention and should not be construed as limiting the scope and spirit of the present invention.

Hereinafter, abbreviations in Examples and Comparative Examples have the following meanings.

(A) Polycarbonate resin (PC): polycarbonate resins having melt indexes of (A1) 15 g/10 min, (A2) 22 g/10 min and (A3) 30 g/10 min were used.

(B) Rubber-modified styrene-based graft copolymer (ABS): DP270E (product name) produced by LG Chem., LTD. was used.

(C) Bulk copolymer (SAN) of aromatic vinyl compound and vinyl cyan compound: 81HF (product name) produced by LG Chem., LTD. (76% by weight of an aromatic vinyl compound and 24% by weight of a vinyl cyan compound) was used.

(D) Ethylene acrylate-based copolymer: Elvaloy 1330AC (product name, methacrylate monomer content: 30%) produced by DuPont Corp. was used.

(E) Glass fiber: Chopped glass fiber produced by Owens Corning Corp., having a diameter of 10 to 13 μm and a length of 3 mm and surface-treated with aminosilane, was used.

(F) Aromatic phosphate ester-based compound: bisphenol A diphosphate compound produced by Adeka Co. Ltd. was used.

Examples 1 to 3

Respective components shown in the following Table 1 were melted and mixed according to a predetermined content ratio at 250° C. and in a twin screw extruder to produce pellets, specimens for measuring physical properties were produced using an injection molding machine, and the specimens were tested by a test method. The results are shown in Table 1.

Comparative Examples 1 to 4

Respective components shown in the following Table 1 were melted and mixed according to a predetermined content ratio at 250° C. and in a twin screw extruder to produce pellets, specimens for measuring physical properties were produced using an injection molding machine, and the specimens were tested by a test method. The results are shown in Table 1.

Test Example

Physical property evaluation method of Examples and Comparative Examples was carried out by the following test method.

Flexural strength and flexural modulus: measured in accordance with ASTM D790.

Impact strength: specimen with 1/8" thickness was measured at 23° C. in accordance with ASTM D256.

Flowability (MI): measured at 250° C. and at a load of 2.16 kg in accordance with ASTM D1238.

Appearance qualities: Surface appearance of molded articles was synthetically evaluated from the first grade (good) to the fifth grade (bad) in a visual and tactile manner or using an electron microscope. Regarding grade base, appearance of a material not using glass fiber was set to the first grade.

Flame-retardancy: specimen with 1/16" thickness was measured in accordance with a UL94 method.

TABLE 1

| Items | Examples | | | Comparative Examples | | | |
|---|---|---|---|---|---|---|---|
| | 1 | 2 | 3 | 1 | 2 | 3 | 4 |
| (A1) | | | | 62 | | | |
| (A2) | 62 | 54 | 26.5 | | 66 | 58 | 62 |
| (A3) | | | 26.5 | | | | |
| (B) | 5 | 9 | 5 | 5 | 1 | 3 | 5 |
| (C) | 4 | 8 | 4 | 4 | 4 | 12 | 8 |
| (D) | 4 | 2 | 4 | 4 | 4 | 2 | 0 |
| (E) | 15 | 15 | 20 | 15 | 15 | 15 | 15 |
| (F) | 10 | 12 | 14 | 10 | 10 | 10 | 10 |
| Flexural strength (kg f/cm$^2$) | 1350 | 1250 | 1410 | 1360 | 1420 | 1480 | 1340 |
| Flexural modulus (kgf/cm$^2$) | 52000 | 46000 | 57000 | 52500 | 53500 | 55000 | 52500 |
| Impact strength (kg · cm/cm) | 7.1 | 8.1 | 5.9 | 8.3 | 3.2 | 2.1 | 6.8 |
| Flowability (g/10 min) | 10.2 | 12.5 | 13.2 | 6.1 | 8.3 | 16.7 | 11.5 |
| Surface appearance | 2 | 2 | 3 | 2 | 2 | 3 | 5 |
| Flame-retardancy | V-0 | V-0 | V-0 | V-0 | V-0 | V-2 | V-0 |

As can be seen from Table 1 above, Examples 1 to 3 comprising the rubber-modified styrene-based copolymer, the copolymer of the aromatic vinyl compound and the vinyl cyan compound, the ethylene acrylate-based copolymer and the phosphate ester-based compound blended within the content ranges defined above enabled preparation of glass fiber-reinforced flame-retardant polycarbonate resins which exhibited superior flowability, improved impact resistance and hardness, and excellent surface appearance.

On the other hand, it can be seen that Comparative Example 1 using the polycarbonate resin (A1) having a melt index of 15 g/10 min exhibited excellent balance between physical properties, but sharp deterioration in flowability. Comparative Examples 2 to 4 comprising the rubber-modified styrene-based copolymer, the copolymer of the aromatic vinyl compound and the vinyl cyan compound, and the ethylene acrylate-based copolymer blended out of the content ranges defined above exhibited deterioration in impact strength, flowability, flame retardancy, appearance qualities and the like.

What is claimed is:

1. A glass fiber-reinforced polycarbonate flame-retardant resin composition comprising:
   (A) 50 to 75% by weight of polycarbonate having a melt index (300° C., 1.2 kg) of 22g/10 min or more;
   (B) 3 to 15% by weight of a rubber-modified styrene-based graft copolymer;
   (C) 3 to 10% by weight of a bulk copolymer of an aromatic vinyl compound and a vinyl cyan compound;
   (D) 1 to 10% by weight of an ethylene acrylate-based copolymer;
   (E) 10 to 25% by weight of glass fiber; and
   (F) 5 to 20% by weight of an aromatic phosphate ester-based compound.

2. The glass fiber-reinforced polycarbonate flame-retardant resin composition according to claim 1, wherein the rubber-modified styrene-based graft copolymer is obtained by grafting the aromatic vinyl compound and the vinyl cyan compound in a conjugated diene-based rubber polymer.

3. The glass fiber-reinforced polycarbonate flame-retardant resin composition according to claim 1, wherein the bulk copolymer of the aromatic vinyl compound and the vinyl cyan compound is obtained by continuously bulk-polymerizing 20 to 90% by weight of the aromatic vinyl compound, and 10 to 80% by weight of the vinyl cyan compound.

4. The glass fiber-reinforced polycarbonate flame-retardant resin composition according to claim 1, wherein the aromatic vinyl compound comprises at least one selected from the group consisting of styrene, α-methyl styrene, para-methyl styrene, o-ethyl styrene, para-ethyl styrene and vinyl toluene.

5. The glass fiber-reinforced polycarbonate flame-retardant resin composition according to claim 1, wherein the vinyl cyan compound comprises at least one selected from the group consisting of acrylonitrile, methacrylonitrile and ethacrylonitrile.

6. The glass fiber-reinforced polycarbonate flame-retardant resin composition according to claim 1, wherein the ethylene acrylate-based copolymer comprises 15 to 50% by weight of a (meth)acrylate-based monomer.

7. The glass fiber-reinforced polycarbonate flame-retardant resin composition according to claim 1, wherein the glass fiber is chopped glass fiber with a length of 2 to 5 μm and a diameter of 1 to 100 μm.

8. The glass fiber-reinforced polycarbonate flame-retardant resin composition according to claim 1, wherein the aromatic phosphate ester-based compound comprises at least one selected from the group consisting of triphenyl phosphate, tricresyl phosphate, trixylenyl phosphate, cresyl diphenyl phosphate, octyl diphenyl phosphate, bisphenol A diphosphate and aromatic diphosphate having a structure represented by the following Formula 1:

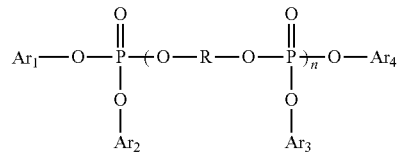

Formula 1 wherein $Ar_1$, $Ar_2$, $Ar_3$ and $Ar_4$ are identical or different, and are each independently selected from the group consisting of a phenyl group and an aryl group substituted by one to three alkyl groups having 1 to 4 carbon atoms, R is phenyl or bisphenol-A and n is an integer of 1 to 5.

9. The glass fiber-reinforced polycarbonate flame-retardant resin composition according to claim 1, wherein the composition provides a glass fiber-reinforced resin for a housing for large electrical and electronic products.

* * * * *